(12) United States Patent
Banadaki et al.

(10) Patent No.: US 10,152,557 B2
(45) Date of Patent: Dec. 11, 2018

(54) EFFICIENT SIMILARITY RANKING FOR BIPARTITE GRAPHS

(71) Applicant: GOOGLE INC., Mountain View, CA (US)

(72) Inventors: Seyed Vahab Mirrokni Banadaki, New York, NY (US); Silvio Lattanzi, New York, NY (US); Jonathan Ezra Feldman, New York, NY (US); Alessandro Epasto, Rome (IT); Stefano Leonardi, Rome (IT); Hugh Lynch, Rocky Hill, NJ (US); Varun Sharma, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 853 days.

(21) Appl. No.: 14/278,811

(22) Filed: May 15, 2014

(65) Prior Publication Data

US 2015/0220530 A1    Aug. 6, 2015

Related U.S. Application Data

(60) Provisional application No. 61/934,440, filed on Jan. 31, 2014.

(51) Int. Cl.
*G06F 17/30* (2006.01)
*G06F 17/00* (2006.01)
*G06Q 30/02* (2012.01)

(52) U.S. Cl.
CPC .... *G06F 17/30943* (2013.01); *G06F 2216/03* (2013.01); *G06Q 30/0241* (2013.01)

(58) Field of Classification Search
CPC ......... G06F 17/30867; G06F 17/30958; G06F 17/30598; G06F 17/3053; G06F 17/30864;
(Continued)

(56) References Cited

U.S. PATENT DOCUMENTS 7,315,973 B1 * 1/2008 Wise .............. G01R 31/318364
703/14
8,832,091 B1 * 9/2014 Bhagat .............. G06F 17/30958
707/723

(Continued)

OTHER PUBLICATIONS

Dblp dataset, accessed on Sep. 12, 2013 from http://dblp.uni-trier.de/xml/, 1 page.
(Continued)

*Primary Examiner* — Yicun Wu
(74) *Attorney, Agent, or Firm* — Brake Hughes Bellermann LLP (57) ABSTRACT

Systems and methods offer an efficient approach to computing similarity rankings in bipartite graphs. An example system includes at least one processor and memory storing a bipartite graph having a first set and a second set of nodes, with nodes in the first set being connected to nodes in the second set by edges. The memory also stores instructions that, when executed by the at least one processor, cause the system to assign each node in the second set to one of a plurality of categories and, for each of the plurality of categories, generate a subgraph. The subgraph comprises of a subset of nodes in the first set and edges linking the nodes in the subset, where the nodes in the subset are selected based on connection to a node in the second set that is assigned to the category. The system uses the subgraph to respond to queries.

20 Claims, 6 Drawing Sheets

(58) Field of Classification Search
CPC ........... G06F 17/3071; G06F 17/30265; G06F 17/5045; G06F 17/30241; G06F 17/30294; G06F 17/30584; G06F 17/3064; G06F 17/30699; G06F 17/30731; G06F 17/30781; G06F 17/30; G06F 17/00; G06Q 30/02
See application file for complete search history.

(56) References Cited

U.S. PATENT DOCUMENTS

| | | | | |
|---|---|---|---|---|
| 2007/0239694 | A1* | 10/2007 | Singh | G06F 17/30958 |
| 2009/0063455 | A1* | 3/2009 | Li | G06F 17/30864 |
| 2009/0124507 | A1* | 5/2009 | Sun | G06F 19/24 506/8 |
| 2009/0160860 | A1* | 6/2009 | Slaney | G06F 17/30268 345/440 |
| 2012/0323932 | A1* | 12/2012 | Xin | G06F 17/30734 707/749 |
| 2013/0073346 | A1* | 3/2013 | Chun | G06Q 30/0281 705/7.39 |
| 2014/0317038 | A1* | 10/2014 | Mojsilovic | G06Q 10/00 706/46 |

OTHER PUBLICATIONS

Adamic et al., "Friends and neighbors on the Web", Social Networks, 25:211-230, 2001, 18 pages.
Adamic et al. "Friends and neighbors on the Web", Social networks, 2003, 20 pages.
Anagnostopoulos et al., "Approximation Algorithms for Co-Clustering", Proceedings of the twenty-seventh ACM SIGMOD-SIGACT-SIGART symposium on Principles of database systems, pp. 201-210, 2008, 10 pages.
Andersen et al., "Using PageRank to Locally Partition a Graph", Internet Mathematics, 4(1):35-64, Dec. 20, 2006, 23 pages.
Beeferman et al., "Agglomerative clustering of a search engine query log", KDD, 2000, 10 pages.
Broder et al., "Min-Wise Independent Permutations (extended abstract)", Proceedings of the thirtieth annual ACM symposium on Theory of computing, STOC '98, pp. 327-336, 1998, 36 pages.
Broder et al., "Efficient PageRank approximation via graph aggregation", Information Retrieval, 9(2):123-138, 2006, 16 pages.
Carrasco et al., "Clustering of bipartite advertiser-keyword graph", ICDM, 2003, 8 pages.
Chien et al., "Link Evolution: Analysis and Algorithms", Internet Mathematics, 1(3):277-304, 2004, 28 pages.
Davis et al., "Estimating the Global PageRank of Web Communities", Proceedings of the 12th ACM SIGKDD international conference on Knowledge discovery and data mining, pp. 116-125, 2006, 10 pages.
Dean, et al, "MapReduce: Simplified Data Processing on Large Clusters", Communications of the ACM, vol. 51, Issue 1, 2008, 13 pages.
Deng et al., "A Generalized Co-HITS Algorithm and its Application to Bipartite Graphs", Proceedings of the 15th ACM SIGKDD international conference on Knowledge discovery and data mining, pp. 239-248, 2009, 9 pages.
Dhillon, "Co-clustering documents and words using Bipartite Spectral Graph Partitioning", KDD, 2001, 6 pages.
Gibson et al., "Discovering Large Dense Subgraphs in Massive Graphs", VLDB, 2005, 12 pages.
Greene et al., "Spectral Co-Clustering for Dynamic Bipartite Graphs", 2010, 12 pages.
Hall et al., "The NBER Patent Citation Data File: Lessons, Insights and Methodological Tools", Technical report, National Bureau of Economic Research, 2001, 77 pages.
Hartigan, "Direct Clustering of a Data Matrix", Journal of the American Statistical Association, 67(337):123-129, 1972, 8 pages.

Haveliwala, "Topic-Sensitive PageRank", Proceedings of the 11th international conference on World Wide Web, WWW '02, pp. 517-526, 2002, 10 pages.
Jurafsky et al., "Speech and Language Processing: An Introduction to Natural Language Processing, Computational Linguistics, and Speech Recognition", Prentice Hall PTR, 1st edition, 2000, 975 pages.
Katz, "A new status index derived from sociometric analysis", Psychometrika, 18(1):39-43, 1953, 5 pages.
Kleinberg, "Authoritative Sources in a Hyperlinked Environment", Journal of the ACM, 46(5):604-632, 1999, 34 pages.
Knight, "A Computer Method for Calculating Kendall's Tau with Ungrouped Data", Journal of the American Statistical Association, vol. 61, No. 314, Part 1, Jun. 1966, pp. 436-439, 5 pages.
Kumar et al., "Trawling the Web for emerging cyber-communities", Computer networks, 1999, 13 pages.
Langville et al., "Updating Markov Chains with an eye on Google's PageRank", SIAM Journal on Matrix Analysis and Applications, 27(4):968-987, 2006, 20 pages.
Liben-Nowell et al., "The link-Prediction Problem for Social Networks", Journal of the American Society for Information Science and Ttechnology, (7), Jan. 8, 2004, 19 pages.
Madeira et al., "Biclustering Algorithms for Biological Data Analysis: A Survey", IEEE/ACM Transactions on Computational Biology and Bioinformatics, 1(1):24-45, 2004, 31 pages.
C. D. Meyer, "Stochastic complementation, uncoupling Markov chains, and the theory of nearly reducible systems", SIAM review, 31(2):240-272, 1989, 34 pages.
Mirzal et al., "Eigenvectors for clustering: Unipartite, bipartite, and directed graph cases", Electronics and Information Engineering (ICEIE), Jul. 12, 2010, 9 pages.
Ng et al., "MultiRank: Co-Ranking for Objects and Relations in Multi-Relational Data", Proceedings of the 17th ACM SIGKDD international conference on Knowledge discovery and data mining, Aug. 2011, 9 pages.
Parreira et al., "The JXP Method for Robust PageRank Approximation in a Peer-to-Peer Web Search Network", The VLDB Journal, 17(2):291-313, 2008, 22 pages.
Simon et al., "Aggregation of Variables in Dynamic Systems", Econometrica: Journal of the Econometric Society, vol. 29, No. 2, pp. 111-138, Apr. 1961, 29 pages.
Vattani et al., "Preserving Personalized PageRank in Subgraphs", Proceedings of the 28th International Conference on Machine Learning (ICML-11), pp. 793-800, 2011, 8 pages.
Walpole et al., "Probability and Statistics for Engineers & Scientists", Prentice Hall, 1993, 812 pages.
Wu et al., "Learning Query and Document Similarities from Clickthrough Bipartite Graph with Metadata", Microsoft Research Technical Report, Nov. 2011, 22 pages.
Wu et al., "ApproxRrank: Estimating rank for a subgraph", IEEE 25th International Conference on Data Engineering, pp. 54-65, 2009, 12 pages.
Zha et al., "Bipartite Graph Partitioning and Data Clustering", ACM Proceedings of the tenth international conference on Information and knowledge management, pp. 25-32, 2001, 8 pages.
Dblp dataset, retrieved on Sep. 12, 2013, from http://dblp.uni-trier.de/xml/, 1 page.
"A Quick Look at Ads on Google", Google AdWords, retrieved on Feb. 27, 2014, from www.google.com/adwords, 2 pages.
Adamic et al., "Friends and Neighbors on the Web", Social Networks, 2001, pp. 1-18.
Adamic et al., "Friends and Neighbors on the Web", Social Networks, vol. 25, 2003, pp. 211-230.
Anagnostopoulos et al., "Approximation Algorithms for Co-Clustering", In Proceedings of the Twenty-Seventh ACM SIGMOD-SIGACT-SIGART Symposium on Principles of Database Systems, Jun. 9-12, 2008, 10 pages.
Andersen et al., "Using PageRank to Locally Partition a Graph", Proceedings of the 47th Annual Symposium on Foundations of Computer Science, vol. 4, No. 1, Dec. 20, 2006, 23 pages.
Broder et al., "Min-Wise Independent Permutations", In Proceedings of the Thirtieth Annual ACM Symposium on Theory of Computing, 1998, pp. 1-36.

(56) References Cited

OTHER PUBLICATIONS

Broder et al., "Efficient PageRank Approximation Via Graph Aggregation", Information Retrieval, vol. 9, 2006, pp. 123-138.

Chien et al., "Link Evolution: Analysis and Algorithms", Internet Mathematics, vol. 1, No. 3, 2004, pp. 277-304.

Davis et al., "Estimating the Global PageRank of Web Communities", In Proceedings of the 12th ACM SIGKDD International Conference on Knowledge Discovery and Data Mining, Aug. 20-23, 2006, 10 pages.

Dean et al., "MapReduce: Simplified Data Processing on Large Clusters", 6th Symposium on Operating Systems Design and Implementation, 2004, pp. 137-149.

Deng et al., "A Generalized Co-HITS Algorithm and its Application to Bipartite Graphs", In Proceedings of the 15th ACM SIGKDD International Conference on Knowledge Discovery and Data Mining, Jun. 28-Jul. 1, 2009, 9 pages.

Dhillon, Inderjit S.,"Co-Clustering Documents and Words Using Bipartite Spectral Graph Partitioning", KDD, 2001, 6 pages.

Gibson et al., "Discovering Large Dense Subgraphs in Massive Graphs", Proceedings of the 31st VLDB Conference, 2005, pp. 721-732.

Greene et al., "Spectral Co-Clustering for Dynamic Bipartite Graphs", Jul. 2010, 12 pages.

Hartigan, J. A., "Direct Clustering of a Data Matrix", Journal of the American Statistical Association, vol. 67, No. 337, Mar. 1972, pp. 123-129.

Haveliwala, Taher H., "Topic-Sensitive PageRank", In Proceedings of the 11th International Conference on World Wide Web, WWW 2002, May 7-11, 2002, 10 pages.

Katz, Leo, "A New Status Index Derived from Sociometric Analysis", Psychometrika, vol. 18, No. 1, Mar. 1953, pp. 39-43.

Knight, William R., "A Computer Method for Calculating Kendall's Tau with Ungrouped Data", Journal of the American Statistical Association, vol. 61, No. 314, Part 1, 1966, pp. 436-439.

Kleinberg, Jon M., "Authoritative Sources in a Hyperlinked Environment", Journal of the ACM, vol. 46, No. 5, Sep. 1999, pp. 604-632.

Langville et al., "Updating Markov Chains with an Eye on Google's PageRank", SIAM Journal on Matrix Analysis and Applications, vol. 27, No. 4, 2006, pp. 968-987.

Liben-Nowell et al., "The Link Prediction Problem for Social Networks", Journal of the American Society for Information Science and Technology, (7), Jan. 8, 2007, 19 pages.

Madeira et al., "Biclustering Algorithms for Biological Data Analysis: A Survey", IEEE/ACM Transactions on Computational Biology and Bioinformatics, Jan. 2004, pp. 1-31.

Meyer, C. D., "Stochastic Complementation, Uncoupling Markov Chains, and the Theory of Nearly Reducible Systems", SIAM Review, 1989, pp. 1-34.

Mirzal et al., "Eigenvectors for Clustering: Unipartite, Bipartite, and Directed Graph Cases", In Electronics and Information Engineering (ICEIE), 2010, 9 pages.

Ng et al., "MultiRank: Co-Ranking for Objects and Relations in Multi-Relational Data", In Proceedings of the 17th ACM SIGKDD international conference on Knowledge discovery and data mining, Aug. 21-24, 2011, pp. 1217-1225.

Parreira et al., "The JXP Method for Robust PageRank Approximation in a Peer-to-Peer Web Search Network", The VLDB Journal Manuscript, 17 (2), 2008, pp. 1-22.

Simon et al., "Aggregation of Variables in Dynamic Systems", Econometrica, vol. 29, No. 2, Apr. 1961, pp. 111-138.

Vattani et al., "Preserving Personalized PageRank in Subgraphs", In Proceedings of the 28th International Conference on Machine Learning (ICML-11), 2011, 8 pages.

Walpole et al., "Probability and Statistics for Engineers and Scientists", Prentice Hall, Ninth Edition, 1993, 812 pages.

Wu et al., "Learning Query and Document Similarities from Click-Through Bipartite Graph with Metadata", WSDM, 2013, 22 pages.

Wu et al., "ApproxRank: Estimating Rank for a Subgraph", IEEE International Conference on Data Engineering, 2009, pp. 54-65.

Zha et al., "Bipartite Graph Partitioning and Data Clustering", In ACM Proceedings of the Tenth International Conference on Information and Knowledge Management, Nov. 2001, 8 pages.

\* cited by examiner

FIG. 8

EFFICIENT SIMILARITY RANKING FOR BIPARTITE GRAPHS

RELATED APPLICATIONS

This application claims priority to U.S. Provisional Application Ser. No. 61/934,440, filed Jan. 31, 2014, entitled "EFFICIENT SIMILARITY RANKING FOR A BIPARTITE GRAPH," the disclosure of which is incorporated herein by reference.

BACKGROUND

Large data graphs store data and rules that describe knowledge about the data in a form that provides for deductive reasoning. Data graphs can be bipartite, meaning that the nodes in the graph can be divided into two disjoint sets, with all edges going between the two sets. Bipartite graphs can be generated for use in web usage mining, which extracts implicit knowledge from data that captures user interactions with the web. For example, a bipartite graph may be generated with one set of nodes representing people or organizations and the other set of nodes representing actions, interests, etc., relevant to the people or organizations. For instance, a bipartite graph may have advertisers in one set of nodes and queries in another set of nodes, where an advertiser is connected to a query when their ad has been shown in response to the query. The edges connecting the first set of nodes to the second set of nodes can be weighted, or each edge may be counted the same. Bipartite graphs are commonly lopsided, with many more nodes in one set than the other. Such graphs may also be very large. For example, the advertising graph may have billions of queries but only millions of advertisers.

Bipartite graphs can be used in data mining, for example to detect interesting patterns and connections between nodes of one type and nodes of another type, for example between users and other actors. Users or other actors may represent one set of nodes and items representing data collected from search records or application logs may be the second set of nodes. Actors in such a graph are connected to items that describe their web usage patterns. Often the items can be put into categories that generalize the actions. Determining which actors are similar to other actors, e.g., computing a similarity ranking between one actor and another actor, is a desirable tool for web mining. Targeted similarity, or determining which actors are similar to other actors within a category or a subset of categories, can also be important, especially for advertising, social media, retail, and the like, to personalize services in a more effective way. Similarity rankings can be used, for example, to identify a competing advertiser, to suggest related queries for an advertiser, to find people with similar interests, etc. Computing similarity rankings, however, is challenging in a large graph due to the sheer amount of data.

SUMMARY

Some implementations provide an efficient approach to computing similarity rankings in bipartite graphs using various similarity metrics. The approach is based on a reduction operator that reduces the bipartite graph into multiple subgraphs, and an aggregation operator for aggregating two or more of the subgraphs and determining similarity rankings for a specified node. For a bipartite graph with A nodes and B nodes the system may assign each B node to a category, where the categories are disjoint. Thus, each node in the B nodes is assigned to one category. The system may then generate a subgraph for each category using a reduction operation. The reduction operation outputs, for each category in isolation, a compact representation of the information used to compute the similarity rankings in that category. The nodes in the subgraph are A nodes from the bipartite graph connected to each other by a weighted edge. The weight of the edge is determined by a similarity metric. Two A nodes connected by an edge in the subgraph indicates they each connect to the same B node in the bipartite graph, the B node being assigned to the category for the subgraph. Because the subgraph eliminates the B nodes, the size of a subgraph is bounded by the quantity of A nodes. The subgraphs may be generated in a batch mode or off-line, and stored, so they are available to generate real-time similarity rankings in response to a query. When a query identifies a particular A node and a subset of the categories, the system may aggregate the subgraphs for the identified subset of categories, determining a similarity ranking for other A nodes to the particular A node identified in the query. Like the reduction operation, the aggregation operation is dependent on the similarity metric used in generating the subgraphs.

In one aspect, a computer system includes at least one processor and memory storing a bipartite graph having a first set of nodes and a second set of nodes, nodes in the first set being connected to nodes in the second set by edges. The memory also stores instructions that, when executed by the at least one processor, cause the system to assign each node in the second set to one of a plurality of categories and, for each of the plurality of categories, generate a subgraph. The subgraph may include a subset of nodes in the first set and edges linking the nodes in the subset, where the nodes in the subset are selected based on connection to a node in the second set that is assigned to the category. The system may store the subgraph in the memory.

In another aspect, a method includes determining, using at least one processor, that a first node in a first set of nodes in a bipartite graph is linked to a second node in a second set of nodes in the bipartite graph, determining, using the at least one processor, that a third node in the first set of nodes is linked to the second node in the bipartite graph, and generating, in a subgraph, a link between the first node and the third node, the link having a weight determined by a similarity metric. The method also includes repeating the determining and generating for other nodes in the first set of nodes, so that the subgraph includes nodes in the first set linked to each other and storing the subgraph in a memory.

In another aspect, a method includes storing a bipartite graph comprising a first set of nodes and a second set of nodes, the first set and the second set being disjoint sets and, prior to receiving a query, generating subgraphs of the bipartite graph comprising nodes of the first set such that a similarity function computed on the bipartite graph would have the same result as a similarity function computed on the subgraphs. The method may also include receiving the query, which identifies a particular node from the first set of nodes, aggregating two or more of the subgraphs to determine other first nodes most similar to the particular first node, and using one or more of the other first nodes for responding to the query.

In another aspect, a non-transitory computer-readable medium may include instructions executable by at least one processor that cause a computer system to perform one or more of the methods described above.

One or more of the implementations of the subject matter described herein can be implemented so as to realize one or more of the following advantages. As one example, the method allows real-time similarity rankings to be computed on large, unbalanced bipartite graphs. Implementations precompute the minimum amount of information needed to answer on-the-fly a personalized similarity ranking on a specific subset of categories. Implementations are also flexible, offering a variety of similarity metrics to be used in the calculation of similarity ranking.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
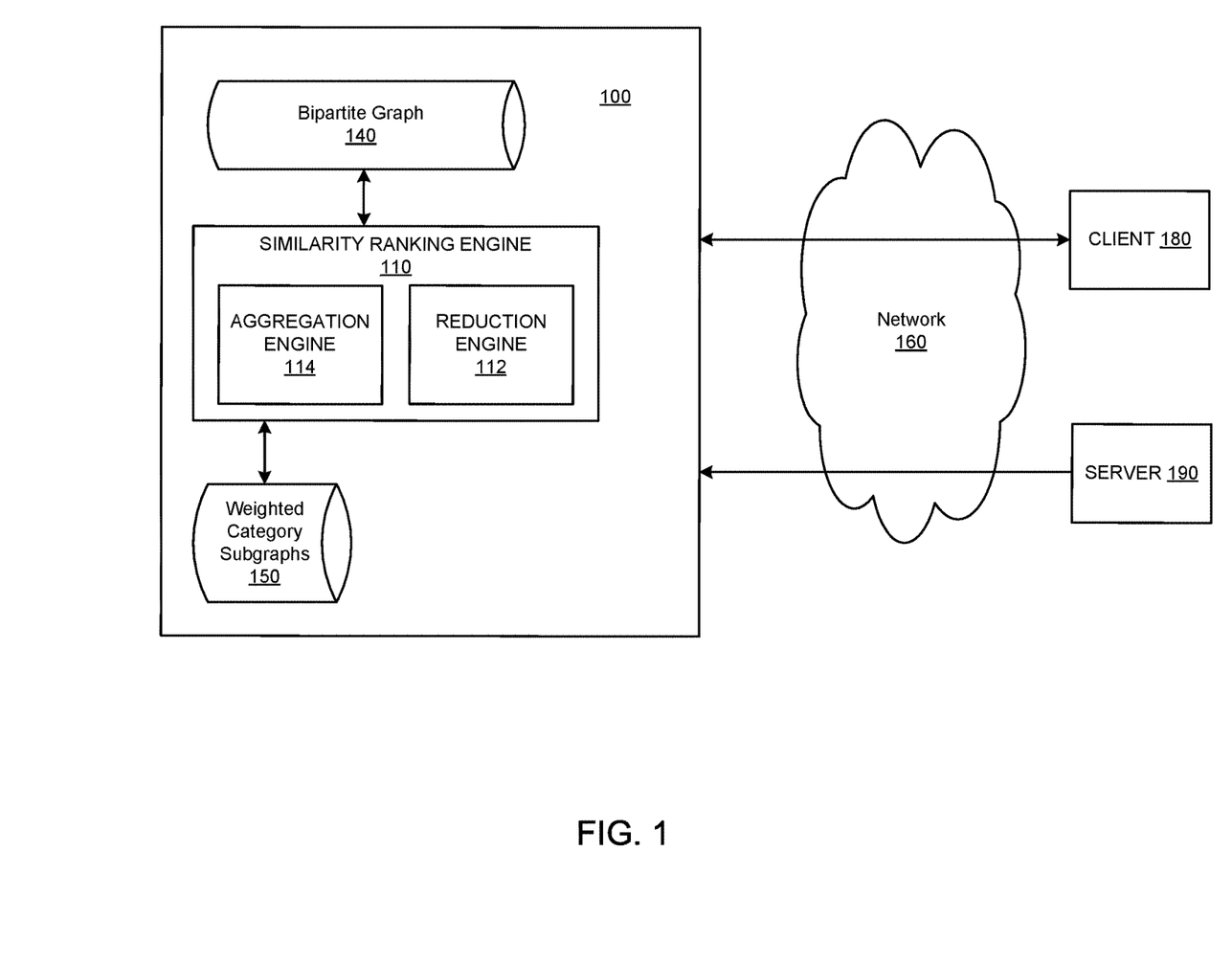
FIG. 1 illustrates an example system in accordance with the disclosed subject matter.

FIG. 1 is a block diagram of a graph system in accordance with an example implementation. The system 100 may be used to efficiently determine similarity rankings in a bipartite graph. While the system 100 can be used to find similarity rankings between nodes in any bipartite graph, the system 100 is especially useful for large, lopsided bipartite graphs as the processing time to calculate similarity rankings in such graphs is cost- and time-prohibitive. A lopsided bipartite graph is a bipartite graph where one set of nodes (e.g., the actors) are an order of magnitude smaller than the other set of nodes (e.g., the items). In large bipartite graphs, the smaller set of nodes may be several orders of magnitude smaller, for example 1000 times smaller than the larger set of nodes. Such large graphs may include billions of nodes.

Figure 7:
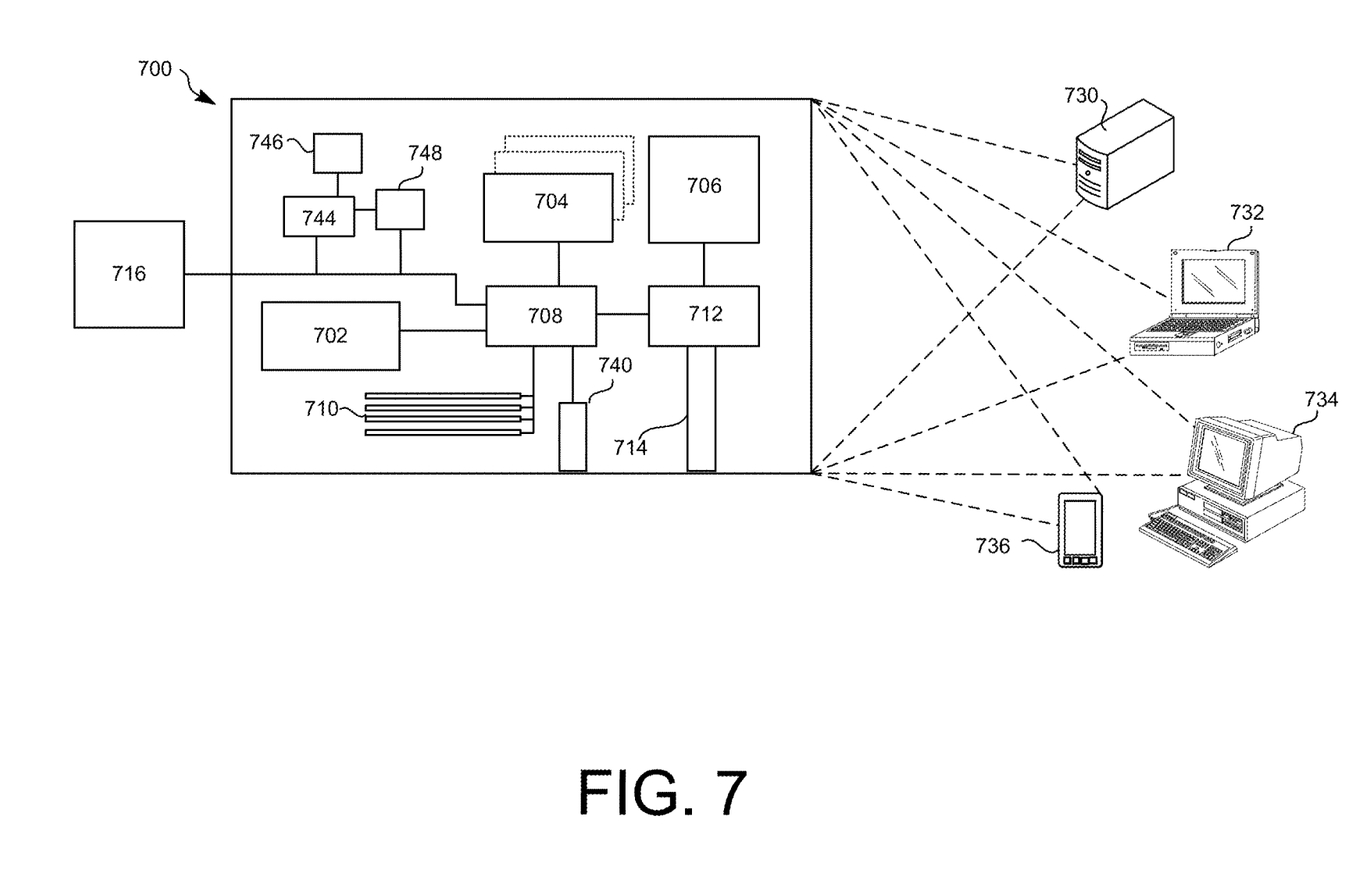
FIG. 7 shows an example of a computer device that can be used to implement the described techniques.
Figure 8:
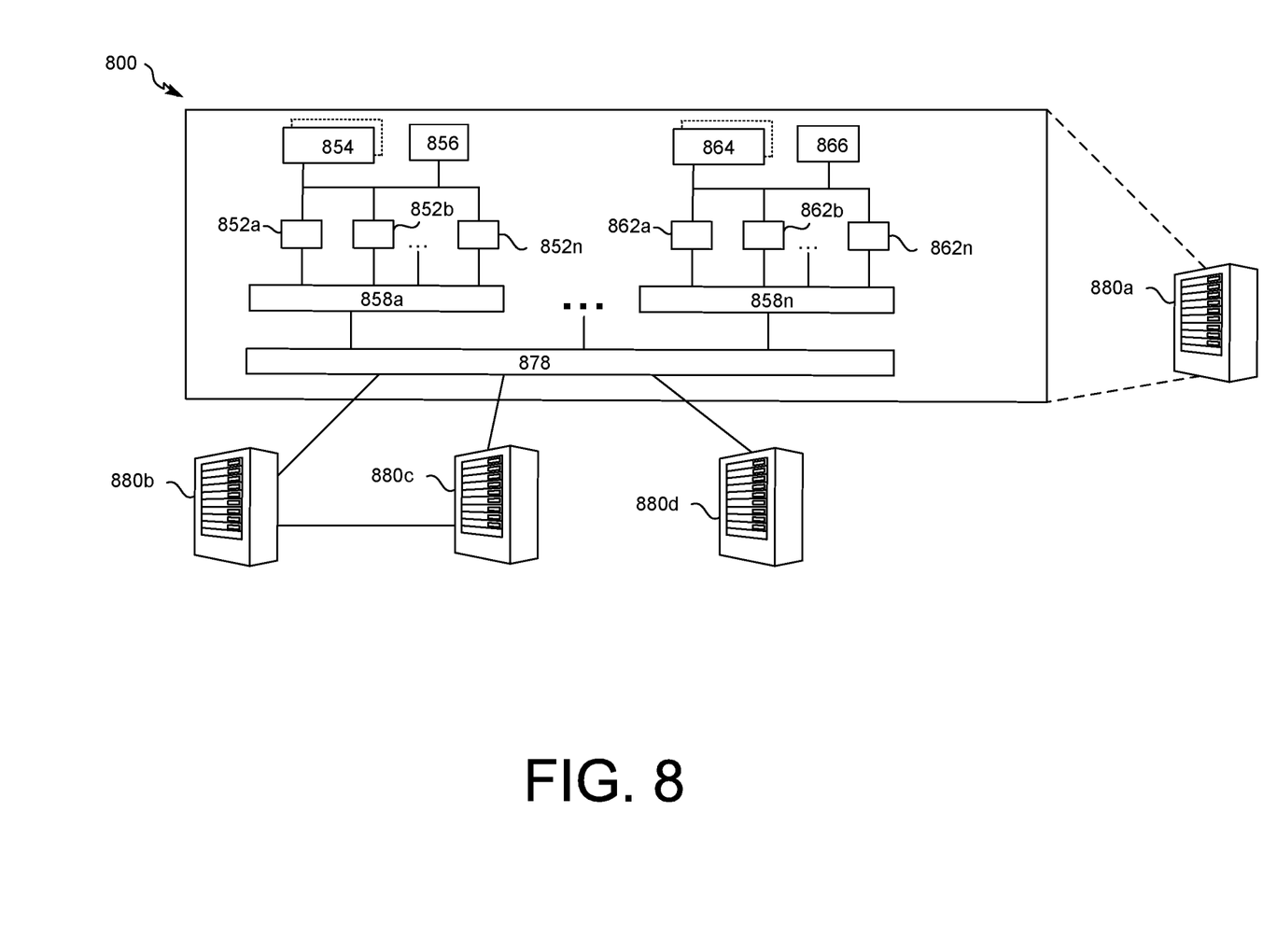
FIG. 8 shows an example of a distributed computer device that can be used to implement the described techniques.

The graph system 100 may be a computing device or devices that take the form of a number of different devices. For example the system 100 may be a standard server, a group of such servers, a client-server system, or a rack server system. In addition, system 100 may be implemented in a personal computer, for example a laptop computer. The graph system 100 may be an example of computer device 700, as depicted in FIG. 7, or computer device 800, as depicted in FIG. 8.

Figure 3:
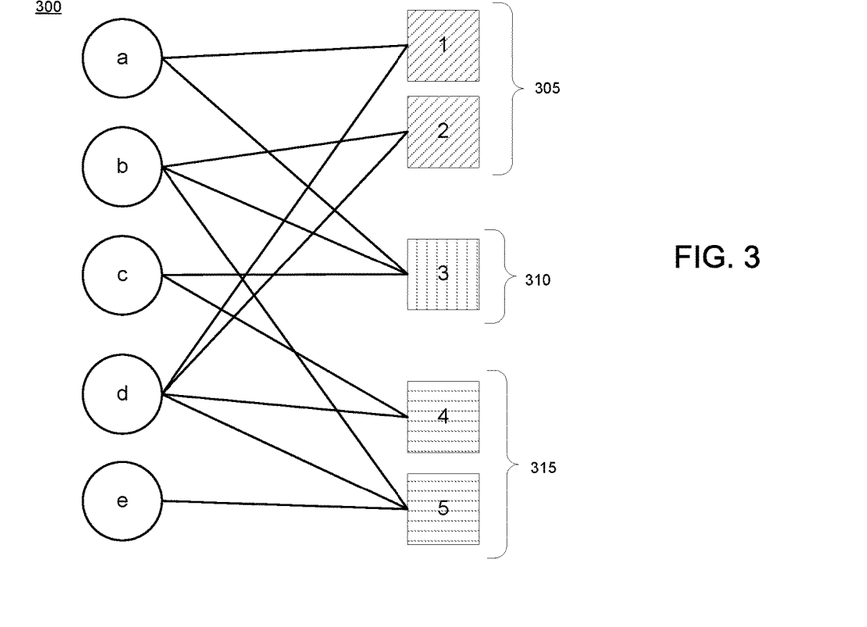
FIG. 3 illustrates an example of a bipartite graph, in accordance with an implementation.

The graph system 100 may include a bipartite graph 140. The bipartite graph 140 can be a directed edge-labeled graph. Such a data graph stores nodes and edges. The nodes in the data graph can be divided into two disjoint sets. In some implementations the first set represents actors and the other set represents items. While the bipartite graph 140 is described as having actor nodes and item nodes for ease in discussing to the two sets of nodes, it is understood that implementations are not limited to bipartite graphs with actor nodes and item nodes. The system 100 may operate on any bipartite graph regardless of the types of nodes. The bipartite graph 140 can be described using the notation $G=(A \cup B, E)$ where $G$ is the bipartite graph, $A$ is the set of actor nodes, $B$ is the set of item nodes, and $E$ is the set of edges connecting actor nodes to item nodes. In the bipartite graph 140 nodes in the first set (e.g., the actors or A nodes) are connected to nodes in the second set (e.g. the items or B nodes) via the edges. In some implementations, the item nodes are assigned to a category. For example, the items may represent queries and each query may be assigned to a market segment in an advertising platform. The categories are disjoint, so that each item node is assigned to one category. The set of categories may be represented by C such that $\{C_1, C_2, \ldots, C_n\} = C$ and $C_1$ is the subset of B nodes that are assigned to $C_1$. Graph 300 of FIG. 3 illustrates an example of a small bipartite graph. The graph 300 includes actor nodes a-e and item nodes 1-5. Item nodes 1-5 are assigned to one of three categories, category 305, category 310, and category 315. It is understood that the two sets of nodes may represent groups other than actors and items. In some implementations, the edges between nodes in the first set and nodes in the second set can be weighted. In some implementations, bipartite graph 140 may be stored in an external storage device accessible from system 100. In some implementations, the bipartite graph 140 may be distributed across multiple storage devices and/or multiple computing devices, for example multiple servers. In such a distributed graph the system may use MapReduce or a similar model for performing computations on the graph.

Although not shown in FIG. 1, the graph system 100 can include one or more processors (e.g., silicon-based hardware processors) configured to execute one or more machine executable instructions or pieces of software, firmware, or a combination thereof. The graph system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include a similarity ranking engine 110. The similarity ranking engine 110 may oversee the creation of weighted category subgraphs 150 and the generation of responses to queries. In some implementations the similarity ranking engine 110 may include a reduction engine 112. The reduction engine 112 may operate in an off-line or batch mode to generate the weighted category subgraphs 150 from the bipartite graph 140. The reduction engine 112 may take as input the bipartite graph 140 and generate as output a subgraph 150 for each category in the set of categories C. Thus, using the example above, the reduction engine 112 may generate one subgraph for each market segment. In some implementations, the reduction engine 112 may be configured to output one set of weighted category subgraphs 150 for each of a number of similarity metrics. In some implementations the reduction engine 112 may include various versions and the version invoked determines the similarity metric used to generate the subgraphs 150. Thus, it is understood that weighted category subgraphs 150 may include multiple versions of subgraphs 150, one for each similarity metric. For example, subgraphs 150 may include one set of subgraphs for a Neighborhood Intersection similarity metric and another set of subgraphs for a Personalized PageRank similarity metric, as one example. Both sets may be generated from the same input, e.g., bipartite graph 140.

The weighted category subgraphs 150 are graphs generated by a reduction operation on bipartite graph 140. Subgraphs 150 include nodes of one type from the bipartite graph 140. For example, subgraphs 150 may include only actor nodes. A subgraph may be thus represented by the notation $\hat{G}_i = G[A \cup C_i]$. Thus, each subgraph may be for actor nodes connected to common item nodes assigned to one specific category. Thus, actor nodes included in a subgraph for a particular category are connected in the bipartite graph to at least one item node that is assigned to the category. In some implementations, the subgraph may be generated using large scale computations in MapReduce due to the size of the bipartite graph. An edge connecting two actor nodes in the subgraph indicate that the two actor nodes were connected to the same item node in the bipartite graph. The system assigns a weight to the edge based on a similarity function. The similarity function is determined based on the similarity metric. The subgraphs may be generated such that a similarity function computed on the bipartite graph G, e.g., sim( ), and a new similarity function computed on the subgraphs, e.g., sim*( ) produce the same results. In other words, for $\forall x, y \in A$, $sim_x(y, G) = sim_x^*(y, \hat{G})$. A similarity ranking is obtained by sorting in decreasing order of $sim_a(\bullet, G)$ the nodes on the A side. Once generated, the weighted category subgraphs 150 may be stored in non-volatile memory so that they may be subsequently accessed and used to calculate a similarity ranking for a particular node in response to a query.

The similarity ranking engine 110 may also include an aggregation engine 114. The aggregation engine 114 may aggregate one or more subgraphs to determine actor nodes in the bipartite graph 140 that are similar to a given actor node. The aggregation engine 114 may take as input the subgraphs 150 for a particular similarity metric and a specified actor node and produce as output a set of actor nodes ranked by their similarity to the specified actor node. For example, given an arbitrary subset of categories $D = \{C'_1, C'_2, \ldots, C'_c\}$ and a particular node $a \in A$ the system may compute similarity ranking $sim_a (\bullet, G')$ where $G' = G[A \cup C'_1 \cup \ldots \cup C'_c]$. In some implementations the aggregation engine 114 may also take as input a similarity metric to be used and may select a set of subgraphs corresponding to the similarity metric. In some implementations the aggregation engine 114 may include various versions, one for each similarity metric and the version invoked determines the similarity metric used.

In some implementations, the similarity ranking engine 110 may also include a search engine (not shown). The search engine may receive queries, identify an actor node and one or more categories from the query and use the aggregation engine 114 to determine actor nodes most similar to the actor node from the query within the provided categories. The search engine may use the most similar nodes in generating a search result from the bipartite graph 140. For example, if an actor node b is found to be similar to the actor node a identified in a query, the search engine may find item nodes from the bipartite graph that are related to b and not a and suggest those items for a in a search result. In some implementations, the search engine may provide the search result to another search engine or other module for combination with search results from other sources.

Graph system 100 may be in communication with client(s) 180 over network 160. Clients 180 may allow a user to submit queries to the similarity ranking engine 110, to maintain bipartite graph 140, to schedule creation of weighted category subgraphs 150, etc. Network 160 may be, for example, the Internet, or the network 160 can be a wired or wireless local area network (LAN), wide area network (WAN), etc., implemented using, for example, gateway devices, bridges, switches, and/or so forth. Via the network 160, the graph system 100 may communicate with and transmit data to/from clients 180. In some implementations, graph system 100 may be in communication with or include other computing devices that provide updates to the bipartite graph 140. For example, graph system 100 may include or be in communication with a computing device that generates entries for bipartite graph 140 from, for example, search records. The graph system 100 represents one example configuration and implementations may incorporate other configurations. For example, elements of the similarity ranking engine 110 may be distributed across different computing devices. For example, the elements of the similarity ranking engine 110 may be distributed across a client computing device and one or more servers that store the bipartite graph 140.

Figure 2:
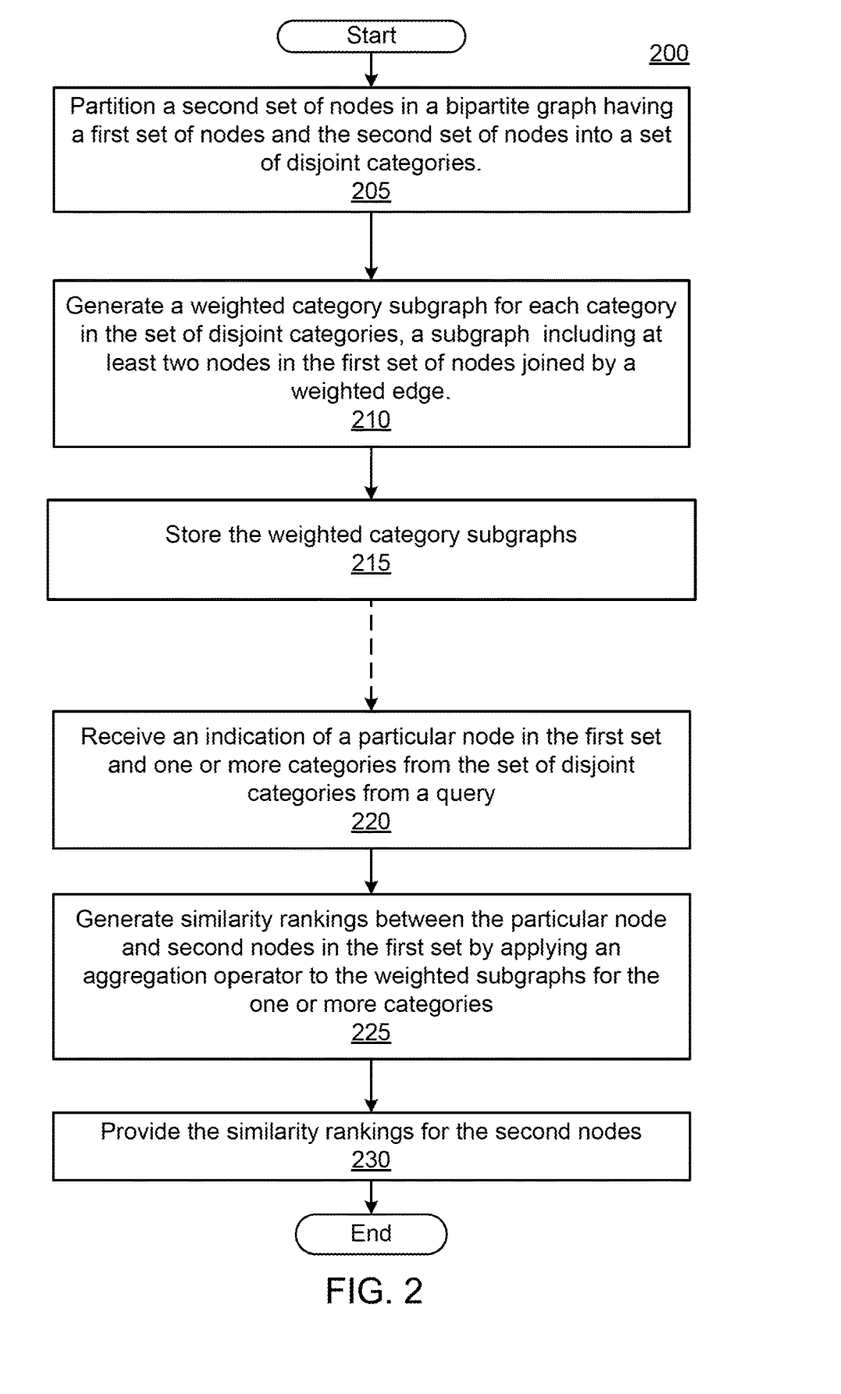
FIG. 2 illustrates a flow diagram of an example process for efficiently determining similarity rankings in a large bipartite graph, in accordance with an implementation.

FIG. 2 illustrates a flow diagram of an example process 200 for efficiently determining similarity rankings in a large bipartite graph, in accordance with an implementation. Process 200 may be performed by a graph system, such as system 100 of FIG. 1. Process 200 may include two operations. The first operation, a reduction operation, may be performed in an off-line or batch manner to generate the weighted category subgraphs. Steps 205 to 215 represent the reduction operation. The system may perform a second operation, an aggregation operation, in real-time to generate similarity rankings for actor nodes in response to a query. Steps 220 to 230 represent the aggregation operation. While the operations are independent of each other, the system must have performed the reduction operation at least once before the system may perform the aggregation operation.

The system performs process 200 on a bipartite graph that has a first set of nodes (e.g., actor nodes) and a second set of nodes (e.g., item nodes). As indicated above, nodes in the first set are labeled actor nodes and nodes in the second set are labeled item nodes for ease of discussion, and process 200 is not limited to nodes characterized in this particular manner. Process 200 begins with the system partitioning the item nodes into a set of disjoint categories (205). In other words, each node in the item nodes is assigned to one of a plurality of categories. Assignment may be performed via an attribute of the item node, or by a labeling function defined on the item nodes, for example. The system may then select a category from among the plurality of categories and generate a subgraph for the category, the subgraph including actor nodes only (210). Actor nodes included in the subgraph are actor nodes that are connected in the bipartite graph to item nodes assigned to the category. An actor node that is connected in the subgraph to another actor node represents the fact that both actor nodes are connected in the bipartite graph to the same item node. The weight of the edge between the two nodes in the subgraph represents a result from a similarity function for the nodes.

The system may repeat the generation of a subgraph for each category in the plurality of categories. Thus, the output of step 210 is a set of subgraphs, one for each category. The system may store the generated subgraphs (215) in a non-volatile memory for later access. In some implementations, the subgraphs may be stored on separate computing devices, or on logical partitions of a computing device, especially when the bipartite graph is very large. Steps 205 to 215 may be repeated periodically, for example daily or weekly, to account for changes to the bipartite graph. In some implementations the reduction operation may be performed as a last step in a batch process that adds additional nodes to the bipartite graph. For example, a process may extract information from search records to generate additional item nodes and connections between the nodes, and the reduction operation may be performed after such modifications are made.

Once a set of subgraphs has been generated, the system may receive a query that includes an indication of a particular actor node and one or more categories (220). In response to the query the system may generate similarity rankings for other actor nodes. In other words, the query may be a request to compute similarity rankings for the particular actor node within specified categories. The system may generate the similarity rankings by aggregating the subgraphs that correspond to the categories indicated in the query (225). A similarity ranking is a value assigned to one of the actor nodes that is not the actor node indicated in the query. The value represents a similarity metric between the two nodes based on the given parameters (e.g., the categories specified in the query). The similarity metric is the same metric used to generate the subgraphs. The system may provide the similarity rankings for the other actor nodes (230) as a response to the query. In some implementations, the similarity rankings may be used by another process to generate a search result. In some implementations, the rankings themselves may be provided as the result. Steps 220 to 230 may be repeated as needed to respond to queries.

Figure 4:
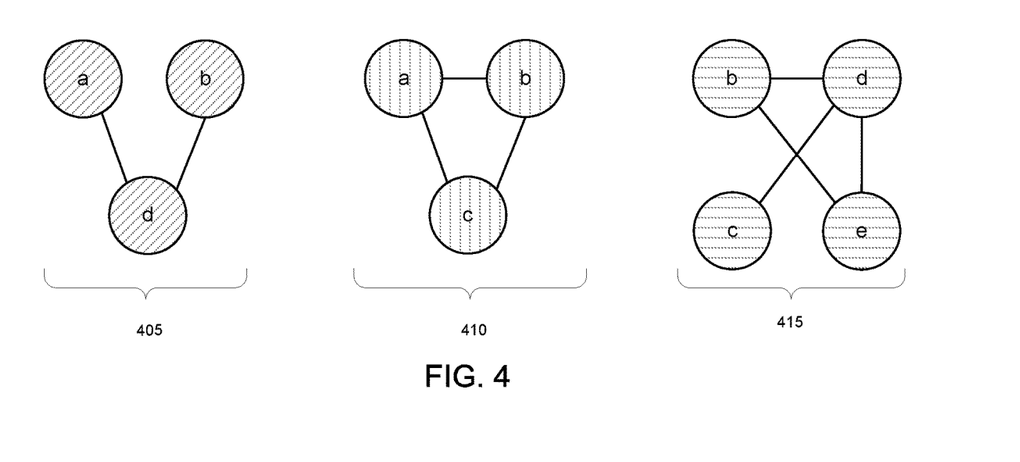
FIG. 4 illustrates an example of subgraphs for the bipartite graph of FIG. 3 generated by a reduction operator, in accordance with an implementation.

An example of the reduction operation and aggregation operations follows, using an example bipartite graph 300 as illustrated in FIG. 3. The graph 300 includes actor nodes a-e and item nodes 1-5. The item nodes are assigned to one of three categories. For example, item nodes 1 and 2 are assigned to category 305, item node 3 is assigned to category 310, and item nodes 4 and 5 are assigned to category 315. When the system performs a reduction operation on the graph 300, three subgraphs are generated. Each subgraph corresponds to one of the three categories. FIG. 4 illustrates the three subgraphs generated by the system. Subgraph 405 corresponds to category 305 and includes actor nodes a, b, and d because these actor nodes are connected in graph 300 to item nodes 1 and/or 2, which are assigned to category 305. Subgraph 410 corresponds to category 310 and includes actor nodes a, b, and c because these nodes are connected to item node 3 in the graph 300. Subgraph 415 corresponds to category 315 and includes actor nodes b, c, d, and e because these nodes are connected to item nodes 4 and/or 5 in the graph 300, and item nodes 4 and 5 are assigned to category 315. Nodes a and d are connected to each other in subgraph 405 because both connect to item node 1 in graph 300. Actor nodes b and d are connected to each other because each is connected to item node 2 in the graph 300. Actor nodes a and b are not connected in subgraph 305 by an edge because a and b do not share a common item node that is assigned to category 305. Similarly, in subgraph 415 nodes b and c are not connected by an edge because they do not share an item node assigned to category 315 in graph 300. Actor nodes b and c are connected in subgraph 410 because each is connected to node 3, which is assigned to category 310.

As discussed above, the edges in the subgraphs are weighted edges. The value of the edge is dependent on the similarity metric used to generate the subgraph. Any of various known similarity metrics may be used. Examples of five similarity metrics are presented below. Given these examples, implementations may be modified to accommodate other similarity metrics in a similar manner.

Figure 5:
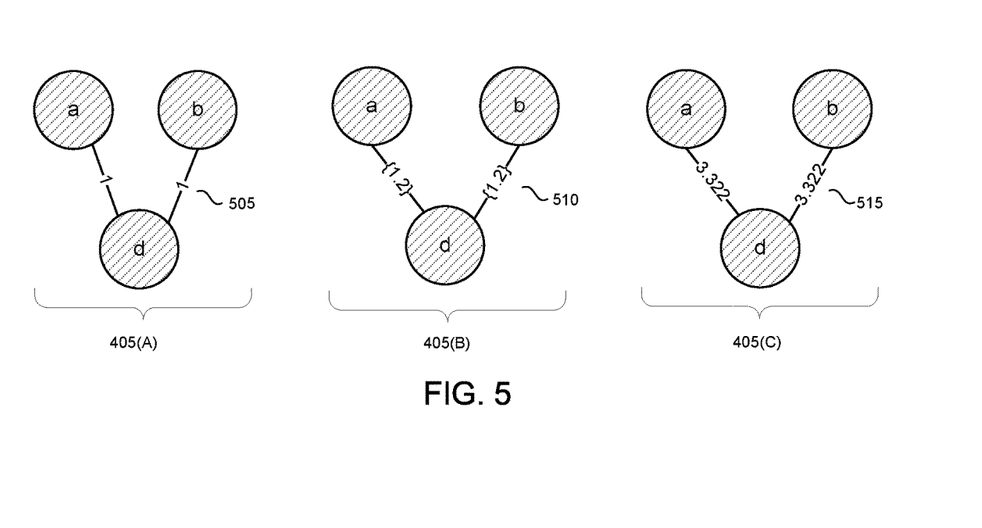
FIG. 5 illustrates weighted edges in one of the subgraphs of FIG. 4 for various similarity metrics, in accordance with implementations.

FIG. 5 illustrates the subgraph 405 when generated using various similarity metrics. Subgraph 405(A) represents a common neighbors weighted subgraph, which can be used with a Neighbor Intersection similarity metric or a Katz similarity metric. The weight of the edges in subgraph 405(A) represents the quantity of item nodes in category 305 that are common to the two actor nodes linked by the edge. Thus, because actor nodes a and d are both linked to item node 2, the weight of the edge between a and d in subgraph 405(A) is 1. Similarly, the weight of the edge between b and d in subgraph 405(A) is 1 because each is linked to item node 1 in graph 300.

In a Neighbor Intersection metric, the similarity function (e.g., how similar is node y to node x) is described as $INT_x(y)=|N(x) \cap N(y)|$ where $N(x)$ is the neighborhood of x in the bipartite graph G (e.g., $N(x)=\{b \in B: (x, b) \in E\}$. With the weight of an edge in the subgraph set to the number of common neighbors, the new similarity function for the subgraphs can be expressed as $INT_x^*(y)=w(x, y)$. To aggregate subgraphs of selected categories, the system adds the weighted edges that connect two nodes in the various subgraphs. This can be represented by $$INT_x(y, G') = \sum_{C_i \in D} INT_x(y, G_i) = \sum_{C_i \in D} INT_x^*(y, \hat{G}_i)$$

where $G'=G[A \cup C'_1 \cup \ldots \cup C'_c]$, $G_i=G[A \cup C_i]$ and $\hat{G}_i$ is the graph obtained by running the reduction operation on $G_i$.

For a Katz similarity metric the similarity function for the bipartite graph can be expressed as $$KATZ_{\beta,x}(y) = \sum_{l=1}^{\infty} \beta^l |P_G(x, y, l)|$$

with $P_G(x, y, l)$ defined as the set of distinct paths of length l between x and y in graph G. Because the length of any path between any two actor nodes is always even in a bipartite graph, the common neighbor weight represents paths with a length of 2. Furthermore, because all paths between actor nodes are even, the new similarity measure can be defined as $$KATZ_{\beta,x}^*(y) = \sum_{i=1}^{\infty} \beta^{2i} \left( \sum_{p \in P_G(x,y,i)} \left( \prod_{e \in p} w(e) \right) \right)$$

To aggregate subgraphs of selected categories, the system may limit similarity to path lengths of 4 (e.g., $\beta^4$) because computation of paths of infinite length is impractical. Paths of length 2 are always in a single subgraph. But path lengths of 4 are not necessarily within one category (e.g., one subgraph, represented by $\hat{G}_i$). For example, node e of graph 300 in FIG. 3 is connected to node c by a path length of 4, but the path from e to b falls in category 315 and the path from b to c falls in category 310. Thus, the system split the length 4 paths into intra-category paths (e.g., path from a to b via d in category 305) and inter-category paths (e.g., path from c to e via d). Assuming path lengths of two and four, the aggregation of two or more subgraphs (e.g., subgraphs in the set D) may be expressed as:

$$KATZ^*_{\beta,x}(y) =$$

$$\beta^2 \sum_{C_i \in D} w_{\hat{G}_i(x,y)} \text{ (Part 1)} + \beta^4 \sum_{C_i \in D} \left( \sum_{p \in P_{\hat{G}_i}(x,y,2)} \left( \prod_{e \in p} w(e) \right) \right) \text{ (Part 2)} +$$

$$\beta^4 \sum_{C_i, C_j \in D, C_i \neq C_j} \left( \sum_{z \in A} w_{\hat{G}_i}(x, z) w_{\hat{G}_j}(z, y) \right) \text{ (Part 3)}$$

for actor nodes x and y.

Subgraph 405(B) represents a weighted subgraph for a Jaccard coefficient similarity metric. A Jaccard coefficient is defined as the ratio between the intersection of the neighborhood of node x, and node y and the union of the neighborhoods. In other words, $$Jac_x(y) = \frac{|N(x) \cap N(y)|}{|N(x) \cup N(y)|}$$

in the bipartite graph G. Accordingly, the weight of an edge in subgraph 405(B) includes a first component and a second component. The first component is the weight for the number of common neighbors, described above with regard to subgraph 405(A). The second component represents the quantity of item nodes in the union of the neighborhoods of the actor nodes. In other words, the total number of item nodes assigned to category 305 that either actor node links to in the bipartite graph. Thus, subgraph 405(B) has {1,2} as the weight between actor nodes a and d. The first component, 1, represents the neighbor intersection, while the second component, 2, represents the neighbor union. 2 is the second component between a and d because a and d link to item node 2 in the graph 300, but d also links to item node 1. Thus two item nodes are in the combined neighborhood. With the weight of the edge defined this way, the new similarity measure can be defined as $$Jac^*_x(y) = \frac{|w \cap (x, y)|}{|w \cup (x, y)|}$$

The aggregation operation for a Jaccard coefficient may be implemented in two steps. To compute the similarity between nodes x and y, the system may, in the first step, sum the first components of the edges between nodes x and y from the desired subgraphs. In the second step the system may divide the sum of the first components by the sum of the second components. The result of the division is the value that represents the similarity ranking for node y given node x.

Subgraph 405(C) represents a weighted subgraph for an Adamic-Adar similarity metric. The Adamic-Adar similarity can be described as $$AA_x(y) = \sum_{z \in N(x) \cap N(y)} \frac{1}{\log|N(z)|}$$

Thus, the weight of an edge connecting two actor nodes in an Adamic-Adar similarity subgraph is equal to the sum of the inverse logarithm of the number of edges leading out of the common item nodes in the bipartite graph. In the bipartite graph 300 of FIG. 3, nodes a and d share one common neighbor, item node 1. Item node 1 has two edges, making the weight of the edge between a and d $$\frac{1}{\log(2)}$$

or 3.322. With the weight of the edge calculated this way, the new similarity function for the subgraph then becomes $AA_x^* = w(x, y)$. The aggregation operation for Adamic-Adar similarity metric is the sum of the weighted edges between two given nodes. Thus, for example, adding the edges connecting node x and node y in various subgraphs provides the similarity ranking for node y with regard to node x.

Figure 6:
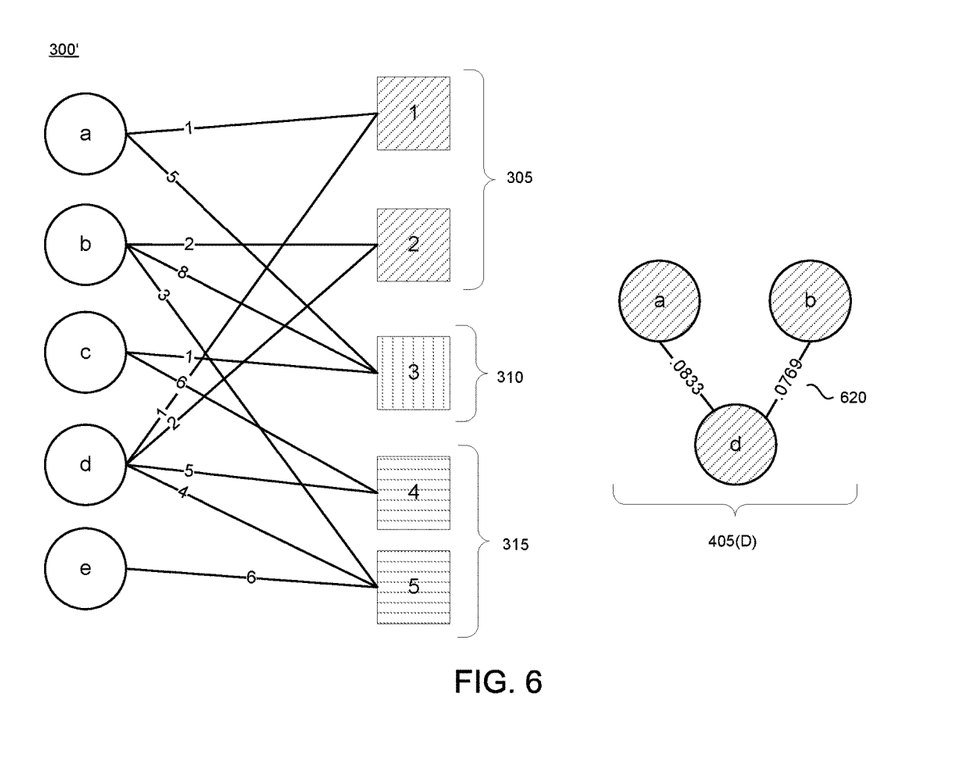
FIG. 6 illustrates an example of a bipartite graph with weighted edges and a subgraph generated using a reduction operation for Personal PageRank similarity, according to an implementation.

FIG. 6 illustrates a weighted bipartite graph 300'. As illustrated, each edge between the actor nodes and the item nodes has a weight w. In some implementations, all edges may have the same weight, for example a weight of 1. Subgraph 405(D) of FIG. 6 represents a weighted subgraph for a Personalized PageRank similarity (PPR). The similarity function for the bipartite graph G (e.g., graph 300') may be expressed as $PPR_{\alpha,x}(y) = \overrightarrow{PPR}(G, \alpha, x)(y)$ where $x \in A$, $\alpha \in 0$ (0,1) and $\overrightarrow{PPR}(G, \alpha, x)$ is defined as the vector presenting the stationary distribution of the following random walk in G. The walk starts at node x. At each step, if the walk is in node n, with probability α it jumps to node x, otherwise it moves to $z \in N(n)$ with the ordinary random walk transition probability $$p(n, z) = \frac{w(n, z)}{\sum_{x \in N(n)} w(n, x)}.$$

The weight of the edge in the subgraph 405(D) thus represents the 2-step ordinary random walk transition probabilities. This may be represented by $$w(x, y) = \sum_{z \in N(x) \cap N(y)} p(x, z)p(z, y)$$

In other words, the weight is the sum of the probability of getting from actor node x to actor node y through item node z. The weights of the edges between x and z and between y and z in the bipartite graph affect this probability. For example, the weight of the edge between actor node a in graph 300' and item node 1 is 1. Actor node a also has a weighted edge of 5 to item node 3. Thus, the probability of getting from a to 1 (e.g., p(a,1)) is $$\frac{1}{(1+5)}$$

or 0.1667. The probability of getting from item node 1 to actor node d (e.g., p(1, d)) is $$\frac{1}{(1+1)}$$

or 0.5. Thus, the 2-step ordinary random walk transition probability for going from a to d is 0.1667*0.5 or 0.0833. Because node 1 is the only node in the intersection of nodes a and d, the weight of the edge in the subgraph 405(D) between a and d is 0.0833. The probability of getting from b to node 2 in graph 300' is $$\frac{2}{(2+8+3)}$$

or 0.1538 while the probability of getting from item node 2 to actor node d is $$\frac{2}{(2+2)}$$

or 0.5. Thus, the 2-step ordinary random walk transition probability for going from b to d is 0.5*0.1538 or 0.0769, and this is the weight of the edge between b and d in subgraph 405(D). The new similarity function for the PPR subgraphs can be expressed as $$PPR^*_{a,x} = \frac{1}{2-\alpha} PPR(\hat{G}, 2\alpha - \alpha^2, x)$$

because in a 2-step PPR walk the probability of not jumping is $(1-\alpha^2)$ and the probability of restarting is $2\alpha-\alpha^2$. Hence, the PPR stationary distribution conditioned on the fact that the random walk is on a node in the A (or actor) nodes is $PPR(\hat{G}, 2\alpha-\alpha^2, x)$ and to get to the correct distribution the system can multiply this distribution by the probability of always being in the A side, or $$\frac{1}{2-\alpha}$$

in a bipartite graph.

To aggregate two or more subgraphs for a PPR similarity metric the system may use an iterative method that alternates a step of one on the entire graph and a step on the subgraph. The iterative method works because we have the random walk stationary distributions on the subgraphs.

More specifically, the definition of the aggregation operation for the PPR similarity metric benefits from additional information on the structure of the bipartite graph. For example, the system may define for any given x ∈A and a category $C_i$ ∈C, the system may define $U_x(C_i) := \Sigma_{y \in N(x) \cap C_i} w(x, y)$. The system may also define for any given x ∈ A and category $C_i$ ∈ C, let $F(x, C_i, C_j)$ be the probability of reaching any node in $C_j$, after performing a 3-step standard random walk, in the bipartite graph G (A∪B, E), starting from the node x and conditioned to the fact that the first step ends in a node in $C_i$.

Notice that both information can be efficiently precomputed in MapReduce with at most 3 MapReductions. So, the real-time aggregate operator can posses such values. In some implementations, the definition of the aggregation operation for PPR similarity may build on the iterative aggregation-disaggregation algorithm of Koury et al, "Iterative methods for computing stationary distributions of nearly completely decomposable markov chains," *SIAM Journal on Algebraic Discrete Methods*, 5(2):164-186, 1984.

The main idea behind this algorithm is the following. Consider a Markov chain whose states are partitioned in a family of disjoint sets $S_1, S_2, \ldots S_c$ and suppose to have an initial approximation $\bar{\pi}$ for the stationary distribution. Let $\bar{\pi}_i$ be the subvector of $\bar{\pi}$ with only values in $S_i$.

Consider the c×c transition matrix T between subsets, i.e. the matrix where $T_{ij}$ is the probability of moving between $S_i$ and $S_j$ at stationary. Koury et al. show that based on an approximation of the stochastic matrix T we can obtain an improved approximation of the actual stationary distribution of the system by a linear combination of the vectors $\bar{\pi}_i$ whose weights are based on the stationary distribution of T.

This operation can repeated an arbitrary quantity of times (after applying at the end of each step some simple matrix operations to avoid the algorithm from being trapped in fixed point) and under certain assumptions on the Markov chain described in details in Koury et al., the algorithm converges in the limit to the exact stationary distribution.

While a very powerful technique, there are a few key algorithmic challenges that the system must overcome to apply this method to the aggregation operation. First of all, in order to approximate the ranking on the subgraph G [A∪C'$_1$∪ . . . ∪C'$_c$], the system needs to aggregate the stationary distributions on subsets of nodes $G_1$= G[A∪C'$_1$], . . . , $G_c$=G[A∪C'$_c$] that are not disjoint. Because of this, the system cannot apply directly the results in the Markov chain state aggregation theory (see, for example, Meyer, "Stochastic complementation, uncoupling Markov chains, and the theory of nearly reducible systems," *SIAM review*, 31(2):240-272, 1989) as they rely on the disjointness of the sets of states aggregated. Second, the aggregate operation is implemented as a real-time algorithm, which means that all the computations depending on the actual classes C'$_1$, . . . , C'$_c$ aggregated, which are only known at the run-time, must be as efficient as possible.

The system thus defines the aggregation operation for PPR similarity to addresses both issues. The input of the aggregation operation is the node a from a query. Thus, the system has been asked to compute the PPR ranking and the set $\bar{\pi}_i = \overrightarrow{PPR}(\hat{G}_i, 2\alpha-\alpha^2, \alpha)$ of stationary distributions (assuming that a has at least an edge in each $C_i$ category aggregated, otherwise such distributions would be trivial with all probability in a) on the category subgraphs. The system may have precomputed F(•) values and U(•) values for the subgraphs and adjacency lists of the subgraphs.

The system may perform iteration of the aggregate operation. Each iteration of the aggregate operation may proceed as follows:

Compute the c×c transition matrix T using the equation $$T_{ij} = (2\alpha - \alpha^2) \frac{U_a(C'_j)}{\sum_{C'_k \in D} U_a(C'_k)} + (1-\alpha)^2 \sum_{x \in A} \pi_i(x) \frac{F(x, C'_i, C'_j)}{\sum_{C'_k \in D} F(x, C'_i, C'_k)};$$

Compute the stationary distribution $t=(t_1, \ldots, t_c)$ of the matrix T.

For each $C'_j \in D$ compute, $$\phi_j = \sum_{i=1}^{c} t_i \sum_{x \in A} \bar{\pi}_i(x) U_x^{-1}(C'_j) \hat{G}_j(x)$$

$$\hat{\pi}_j = (2\alpha - \alpha^2)1_a + (1-\alpha)^2 \frac{\phi_j}{\phi_j e}$$ [Equation 2]

where $1_a$ is a vector with all zeros except a 1 in position a (the size is assumed by the context), $\hat{G}_j(x)$ is the vector representing the row of node x in the adjacency matrix of the reduced graph $\hat{G}_j$ and e is a vector with all ones.

At the end of each iteration, $\hat{\pi}_i$ is fed to the algorithm as the next $\bar{\pi}_i$ vector, and the process is repeated until a convergence criteria is met or the maximum number of steps is reached. Finally in the last step of the algorithm, instead of computing Equation (2) above, the system uses the last $\bar{\pi}_i$ vectors to compute the approximation $\bar{\pi}_i$ of the stationary distribution using the equations:

$$\phi = \sum_{i=1}^{c} t_i \sum_{x \in A} \bar{\pi}_i(x) \left( \sum_{j=1}^{c} U_x(C'_j) \right)^{-1} \sum_{j=1}^{c} U_x(C'_j) R_j(x)$$

$$\hat{\pi} = \alpha 1_a + \frac{(1-\alpha)^2}{2-\alpha} \phi.$$

FIG. 7 shows an example of a generic computer device 700, which may be operated as system 100, and/or client 170 of FIG. 1, which may be used with the techniques described here. Computing device 700 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, e.g., a silicone-based hardware processor, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a personal computer such as a laptop computer 722, or smart phone 736. An entire system may be made up of multiple computing devices 700 communicating with each other. Other configurations are possible.

FIG. 8 shows an example of a generic computer device 800, which may be system 100 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 100, may be made up of multiple computing devices 800 communicating with each other. For example, device 880a may communicate with devices 880b, 880c, and 880d, and these may collectively be known as system 100. As another example, system 100 of FIG. 1 may include one or more computing devices 800. Some of the computing devices may be located geographically close to each other, and others may be located geographically distant. The layout of system 800 is an example only and the system may take on other layouts or configurations.

In one aspect, a computer system includes at least one processor and memory storing a bipartite graph having a first set of nodes and a second set of nodes, nodes in the first set being connected to nodes in the second set by edges. The memory also stores instructions that, when executed by the at least one processor, cause the system to assign each node in the second set to one of a plurality of categories and, for each of the plurality of categories, generate a subgraph. The subgraph may include a subset of nodes in the first set and edges linking the nodes in the subset, where the nodes in the subset are selected based on connection to a node in the second set that is assigned to the category. The system may store the subgraph in the memory.

These and other aspects can include one or more of the following features. For example, the edges in the subgraphs between the nodes in the subset may be weighted, the weights being based on a similarity metric. In such an implementations, the memory may further store instructions that, when executed by the at least one processor, cause the system to receive a query including a particular node in the first set of nodes and a first category of the plurality of categories and a second category of the plurality of categories, calculate similarity rankings for at least some nodes in the first set other than the particular node by applying an aggregation function to the subgraph for the first category and the subgraph for the second category, the aggregation function being based on the similarity metric, and provide the similarity rankings in response to the query. In some implementations, calculating the similarity ranking for a certain node in the first set other than the particular node can include determining that the particular node is linked to the certain node in the subgraph for the first category by a first edge having a first weight, determining that the particular node is linked to the certain node in the subgraph for the second category by a second edge having a second weight, and combining the first weight and the second weight according to the aggregation function to calculate the similarity ranking for the certain node. In some implementations, the first weight and the second weight may each represent a quantity of common neighbors in the bipartite graph between the particular node and the certain node and combining the first weight and the second weight may be achieved by adding the first weight and the second weight. In some implementations the similarity metric is a Jaccard coefficient and the first weight and the second weight include a first component representing a quantity of common neighbors in the bipartite graph between the particular node and the certain node, and a second component representing a quantity of nodes in a union of a neighborhood of the particular node and the certain node. Combining the first weight and the second weight in such an implementation may include dividing a sum of the first components by a sum of the second components. In some implementations, the similarity metric is an Adamic-Adar similarity and the first weight and the second weight represents a sum of, for each common neighbor of the particular node and the certain node in the bipartite graph, an inverse of a logarithm of a quantity of edges connecting the common neighbor, and combining the first weight with the second weight includes adding the first weight to the second weight. In some implementations, the bipartite graph is a weighted bipartite graph and the similarity metric is Personalized PageRank and the first weight represents an ordinary random walk transition probability from the particular node to the certain node in the weighted bipartite graph.

As another example, an edge linking a first node in the subset and a second node in the subset indicates the first node and the second node each connect to a particular node in the second set in the bipartite graph.

In another aspect, a method includes determining, using at least one processor, that a first node in a first set of nodes in a bipartite graph is linked to a second node in a second set of nodes in the bipartite graph, determining, using the at least one processor, that a third node in the first set of nodes is linked to the second node in the bipartite graph, and generating, in a subgraph, a link between the first node and the third node, the link having a weight determined by a similarity metric. The method also includes repeating the determining and generating for other nodes in the first set of nodes, so that the subgraph includes nodes in the first set linked to each other and storing the subgraph in a memory.

These and other aspects can include one or more of the following features. For example, the method may also include receiving a query identifying a particular node in the first set, calculating a similarity ranking for respective nodes in the subgraph linked to the particular node, the similarity ranking being based on the weight of the link between the particular node and the respective node, and providing the similarity rankings as a response to the query.

As another example, the second node may be assigned to a first category of a plurality of categories, the subgraph being a first subgraph and including nodes in the first set linked to nodes in the second set that are assigned to the first category, and the method may include determining that the first node is linked to a fourth node in the second set of nodes in the bipartite graph, the fourth node being assigned to a second category of the plurality of categories, determining that a fifth node in the first set of nodes is linked to the fourth node in the bipartite graph, and generating, in a second subgraph, a link between the first node and the fifth node, the link having a weight determined by the similarity metric. The method may further include repeating the determining and generating so that each category in the plurality of categories has an associated subgraph and storing the associated subgraphs in the memory. In such implementations, the method may also include receiving a query identifying a particular node in the first set and at least the first category and the second category, calculating a similarity ranking for each node in the first subgraph and in the second subgraph that is connected to the particular node by aggregating the subgraph associated with the first category with the subgraph associated with the second category on the particular node, the aggregation being based on the similarity metric, and providing the similarity rankings as a response to the query.

In another aspect, a method includes storing a bipartite graph comprising a first set of nodes and a second set of nodes, the first set and the second set being disjoint sets and, prior to receiving a query, generating subgraphs of the bipartite graph comprising nodes of the first set such that a similarity function computed on the bipartite graph would have the same result as a similarity function computed on the subgraphs. The method may also include receiving the query, which identifies a particular node from the first set of nodes, aggregating two or more of the subgraphs to determine other first nodes most similar to the particular first node, and using one or more of the other first nodes for responding to the query.

These and other aspects can include one or more of the following. For example, the bipartite graph may be distributed among multiple computing devices. In another example, each of the subgraphs may include weighted edges, the weight of the edge being based on a similarity metric corresponding to the similarity function. In such implementations, aggregating the two or more subgraphs generates a similarity ranking for each of the other nodes and the method may also include sorting the other nodes by descending similarity ranking and providing a quantity of other nodes in sorted order as the response. In some implementations, the subgraphs include edges between pairs of nodes in the first set that have a common neighbor node from the second set. In some implementations, the similarity metric may be a neighbor intersection metric, a Jaccard coefficient metric, an Adamic-Adar metric, a Katz metric, or a Personal PageRank metric.

As another example, generating the subgraphs can include partitioning the nodes in the second set into a set of disjoint categories and generating a subgraph for each of the disjoint categories, so that for a particular category in the set of the disjoint categories, edges in a subgraph for the particular category are based on edges between pairs of nodes in the first set that have a common neighbor node from the second set, the common neighbor node being partitioned into the particular category. In such an implementation, the query may identify at least two categories from the disjoint categories, and aggregating the two or more subgraphs includes aggregating subgraphs that correspond to the at least two categories.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
at least one processor; and
memory storing:
a bipartite graph having a first set of nodes and a second set of nodes, nodes in the first set being connected to nodes in the second set by edges, and
instructions that, when executed by the at least one processor, cause the system to:
partition each node in the second set into one category of a plurality of disjoint categories,
for each category of the plurality of disjoint categories:

generate a subgraph for the category, the subgraph comprised of a subset of nodes in the first set and edges linking the nodes in the subset, where the nodes in the subset are selected based on connection to a common neighbor node in the second set that is partitioned into the category, and where edges in the subgraph are based on edges between pairs of nodes in the first set that have the common neighbor node from the second set, and store the subgraph in the memory.

2. The system of claim 1, wherein the edges in the subgraphs between the nodes in the subset are weighted, the weights being based on a similarity metric.

3. The system of claim 2, wherein the memory further stores instructions that, when executed by the at least one processor, cause the system to:

receive a query including a particular node in the first set of nodes and a first category of the plurality of categories and a second category of the plurality of categories;

calculate similarity rankings for at least some nodes in the first set other than the particular node by applying an aggregation function to the subgraph for the first category and the subgraph for the second category, the aggregation function being based on the similarity metric; and provide the similarity rankings in response to the query.

4. The system of claim 3, wherein calculating the similarity ranking for a certain node in the first set other than the particular node includes:

determining that the particular node is linked to the certain node in the subgraph for the first category by a first edge having a first weight;

determining that the particular node is linked to the certain node in the subgraph for the second category by a second edge having a second weight; and combining the first weight and the second weight according to the aggregation function to calculate the similarity ranking for the certain node.

5. The system of claim 4, wherein the first weight and the second weight each represent a quantity of common neighbors in the bipartite graph between the particular node and the certain node and combining the first weight and the second weight is achieved by adding the first weight and the second weight.

6. The system of claim 4, wherein the similarity metric is a Jaccard coefficient and the first weight and the second weight include:
a first component representing a quantity of common neighbors in the bipartite graph between the particular node and the certain node, and
a second component representing a quantity of nodes in a union of a neighborhood of the particular node and the certain node; and combining the first weight and the second weight includes dividing a sum of the first components by a sum of the second components.

7. The system of claim 4, wherein the similarity metric is an Adamic-Adar similarity and the first weight and the second weight represents a sum of, for each common neighbor of the particular node and the certain node in the bipartite graph, an inverse of a logarithm of a quantity of edges connecting the common neighbor, and combining the first weight with the second weight includes adding the first weight to the second weight.

8. The system of claim 4, wherein the bipartite graph is a weighted bipartite graph and the similarity metric is Personalized PageRank and the first weight represents an ordinary random walk transition probability from the particular node to the certain node in the weighted bipartite graph.

9. The system of claim 1, wherein the bipartite graph is lopsided, with nodes in the first set of nodes being at least an order of magnitude smaller in number than nodes in the second set of nodes.

10. A method comprising:

partitioning, using at least one processor, nodes in a second set of nodes of a bipartite graph into a set of disjoint categories; and for each category in the set of disjoint categories:
determining, using the at least one processor, pairs of first nodes in a first set of nodes in the bipartite graph linked to a common neighbor node in the second set of nodes in the bipartite graph, the common neighbor node being partitioned into the category,
generating, for each pair of first nodes, a link in a subgraph for the category linking the pair of first nodes, the link having a weight determined by a similarity metric based on edges between the pair of first nodes and the common neighbor node,
and
storing the subgraph in a memory.

11. The method of claim 10, further comprising:
receiving a query identifying a particular node in the first set;
calculating a similarity ranking for respective nodes in the subgraph linked to the particular node, the similarity ranking being based on the weight of the link between the particular node and the respective node; and
providing the similarity rankings as a response to the query.

12. The method of claim 10, further comprising:
receiving a query identifying a particular node in the first set and at least a first category and a second category;
calculating a similarity ranking for each node in the subgraph for the first category and in the subgraph for the second category that is connected to the particular node by aggregating the subgraph for the first category with the subgraph for the second category on the particular node, the aggregation being based on the similarity metric; and
providing the similarity rankings as a response to the query.

13. The method of claim 10, wherein the similarity metric is a neighbor intersection metric, a Jaccard coefficient metric, an Adamic-Adar metric, a Katz metric, or a Personal PageRank metric.

14. The method of claim 10, wherein the subgraph for each category in the set of disjoint categories is a first subgraph for the category, the similarity metric is a first similarity metric and the method further comprises generating a second subgraph for each category, wherein the edges in the second subgraph have a weight determined by a second similarity metric.

15. A method comprising:
prior to receiving a query, generating subgraphs of a bipartite graph, the bipartite graph comprising a first set of nodes and a second set of nodes, the first set and the second set being disjoint sets, wherein each subgraph comprises nodes of the first set such that a similarity function computed on the bipartite graph would have the same result as a similarity function computed on the subgraphs and generating the subgraph includes:

partitioning the nodes in the second set into a set of disjoint categories, and generating a subgraph for each of the disjoint categories, so that for a particular category in the set of the disjoint categories, edges in a subgraph for the particular category are based on edges between pairs of nodes in the first set that have a common neighbor node from the second set, the common neighbor node being partitioned into the particular category;

receiving the query, which identifies a particular node from the first set of nodes;

aggregating two or more of the subgraphs to determine other first nodes having highest similarity rankings with the particular first node based on the similarity function; and using one or more of the other first nodes for responding to the query.

16. The method of claim 15, wherein the bipartite graph is distributed among multiple computing devices.

17. The method of claim 15, wherein each of the subgraphs include weighted edges, a weight of an edge being based on a similarity metric corresponding to the similarity function.

18. The method of claim 17, wherein aggregating the two or more subgraphs generates a similarity ranking for each of the other nodes and the method further includes:

sorting the other nodes by descending similarity ranking; and providing a quantity of other nodes in sorted order as the response.

19. The method of claim 17, wherein the similarity metric is a neighbor intersection metric, a Jaccard coefficient metric, an Adamic-Adar metric, a Katz metric, or a Personal PageRank metric.

20. The method of claim 15, wherein the query also identifies at least two categories from the disjoint categories, and aggregating the two or more subgraphs includes aggregating subgraphs that correspond to the at least two categories.

* * * * *